(12) United States Patent
Konishi

(10) Patent No.: US 11,560,470 B2
(45) Date of Patent: Jan. 24, 2023

(54) THERMOPLASTIC ELASTOMER COMPOSITION

(71) Applicant: SUMITOMO CHEMICAL COMPANY, LIMITED, Tokyo (JP)

(72) Inventor: Takahiro Konishi, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 10 days.

(21) Appl. No.: 17/386,097

(22) Filed: Jul. 27, 2021

(65) Prior Publication Data
US 2022/0033632 A1 Feb. 3, 2022

(30) Foreign Application Priority Data

Jul. 31, 2020 (JP) ............................. JP2020-130279

(51) Int. Cl.
| | |
|---|---|
| *C08L 23/16* | (2006.01) |
| *B29B 7/48* | (2006.01) |
| *B29C 48/00* | (2019.01) |
| *B29C 45/00* | (2006.01) |
| *B29K 23/00* | (2006.01) |

(52) U.S. Cl.
CPC ............. *C08L 23/16* (2013.01); *B29B 7/48* (2013.01); *B29C 45/0001* (2013.01); *B29C 48/022* (2019.02); *B29K 2023/16* (2013.01); *C08L 2203/30* (2013.01); *C08L 2205/025* (2013.01); *C08L 2205/03* (2013.01); *C08L 2207/04* (2013.01); *C08L 2207/322* (2013.01); *C08L 2312/00* (2013.01)

(58) Field of Classification Search
CPC ................................. C08L 23/12; C08L 23/16
See application file for complete search history.

(56) References Cited

U.S. PATENT DOCUMENTS

| | | | | |
|---|---|---|---|---|
| 5,571,356 A | * | 11/1996 | Skaletz | .................... C08K 7/02 |
| | | | | 156/166 |
| 2003/0059637 A1 | | 3/2003 | Imai et al. | |
| 2018/0100061 A1 | * | 4/2018 | Yamaguchi | ............. C08L 23/10 |

FOREIGN PATENT DOCUMENTS

| | | |
|---|---|---|
| EP | 3604423 A1 | 2/2020 |
| JP | 2002-201313 A | 7/2002 |
| JP | 2002-265715 A | 9/2002 |
| JP | 2003-147133 A | 5/2003 |
| JP | 2009-191256 A | 8/2009 |
| JP | 2010047657 A | 3/2010 |
| WO | 2016204897 A1 | 12/2016 |

OTHER PUBLICATIONS

The Extended European Search Report dated Dec. 22, 2021 issued for European Patent Application No. 21186889.8, 5 pages.

* cited by examiner

*Primary Examiner* — Mark S Kaucher
(74) *Attorney, Agent, or Firm* — Meunier Carlin & Curfman LLC

(57) ABSTRACT

Provided is a thermoplastic elastomer composition capable of producing a molded article having a good appearance such as surface smoothness and excellent bondability to another member, the thermoplastic elastomer composition comprising: an ethylene-based polymer (A); and a propylene-based polymer (B), wherein a melt viscosity of the thermoplastic elastomer composition measured at a temperature of 220° C. and a shear rate of 12 $sec^{-1}$ is 2,500 Pa·sec or less; the thermoplastic elastomer composition has a sea-island structure; and an island portion has a volume average particle diameter of 2.1 μm or more and a particle diameter dispersion D of 7.0 or less.

13 Claims, No Drawings

THERMOPLASTIC ELASTOMER COMPOSITION

CROSS-REFERENCE TO RELATED APPLICATIONS

This application is a non-provisional utility U.S. Application, which claims priority to and benefit of Japanese Application serial number 2020-130279 filed Jul. 31, 2020, the content of which is fully incorporated by reference and made a part hereof.

BACKGROUND OF THE INVENTION

Field of the Invention

The present invention relates to a thermoplastic elastomer composition.

Description of the Related Art

Thermoplastic elastomer compositions are widely used as materials for automobile parts and the like because they are rich in recyclability, suitable for injection molding, and excellent in product performance such as strength and flexibility (see, for example, Patent Document 1 (JP-A-2002-265715)).

As the application of the thermoplastic elastomer composition is expanded, further improvement is required for appearance such as surface smoothness of molded articles and various performances such as bondability to another member.

SUMMARY OF THE INVENTION

Under such circumstances, the problem to be solved by the present invention is to provide a thermoplastic elastomer composition capable of producing a molded article having a good appearance such as surface smoothness and excellent bondability to another member.

The present inventors have conducted intensive studies in view of such a background, and have completed the present invention.

That is, the present invention relates to:

[1]
A thermoplastic elastomer composition comprising:
an ethylene-based polymer (A); and
a propylene-based polymer (B), wherein
a melt viscosity of the thermoplastic elastomer composition measured at a temperature of 220° C. and a shear rate of 12 sec$^{-1}$ is 2,500 Pa·sec or less;
the thermoplastic elastomer composition has a sea-island structure; and
an island portion has a volume average particle diameter of 2.1 μm or more and a particle diameter dispersion D of 7.0 or less.

Hereinafter, [2] to [9] are respectively preferred aspects or embodiments of the present invention.

[2]
The thermoplastic elastomer composition according to [1], further comprising a mineral oil (D), wherein the ethylene-based polymer (A) is oil-extended with the mineral oil (D).

[3]
The thermoplastic elastomer composition according to [1], wherein the ethylene-based polymer (A) has a Mooney viscosity ($ML_{1+4}$ 100° C.) of 40 or more.

[4] The thermoplastic elastomer composition according to [2], wherein an oil-extended polymer comprising the ethylene-based polymer (A) and the mineral oil (D) has a Mooney viscosity ($ML_{1+4}$ 100° C.) of 40 or more.

[5]
A method for producing a thermoplastic elastomer composition, comprising a step of melt-kneading an ethylene-based polymer (A) and a propylene-based polymer (B) in the presence of a crosslinking agent (C), wherein
the ethylene-based polymer (A) has a Mooney viscosity ($ML_{1+4}$ 100° C.) of 40 or more; and
a melt flow rate of the propylene-based polymer (B) has measured under conditions of a temperature of 230° C. and a load of 21.18 N is 1.0 to 200 g/10 min.

[6]
The method for producing a thermoplastic elastomer composition according to [5], wherein a specific energy defined by power consumption (kW)/discharge rate (kg/h) by melt-kneading in the step is 0.27 (kWh/kg) or less.

[7]
A method for producing a thermoplastic elastomer composition, comprising a step of melt-kneading an oil-extended polymer and a propylene-based polymer (B) in the presence of a crosslinking agent (C), wherein
the oil-extended polymer comprises an ethylene-based polymer (A) and a mineral oil (D);
the oil-extended polymer has a Mooney viscosity ($ML_{1+4}$ 100° C.) of 40 or more; and
a melt flow rate of the propylene-based polymer (B) measured under conditions of a temperature of 230° C. and a load of 21.18 N is 1.0 to 200 g/10 min.

[8]
The method for producing a thermoplastic elastomer composition according to [7], wherein a specific energy defined by power consumption (kW)/discharge rate (kg/h) by melt-kneading in the step is 0.27 (kWh/kg) or less.

[9]
The method for producing a thermoplastic elastomer composition according to [5] or [6], wherein the thermoplastic elastomer composition according to [1] or [3] is produced.

[10]
The method for producing a thermoplastic elastomer composition according to [7] or [8], wherein the thermoplastic elastomer composition according to [2] or [4] is produced.

[11]
An injection-molded article comprising the thermoplastic elastomer composition according to any one of [1] to [4].

[12]
A composite molded article which is obtained by bonding the injection-molded article according to [11] and an extrusion-molded article comprising a thermoplastic elastomer composition.

[13]
The composite molded article according to [12], wherein the composite molded article is a glass run channel.

According to the present invention, it is possible to provide a thermoplastic elastomer composition capable of producing a molded article having good appearance such as surface smoothness and excellent bondability to another member.

DETAILED DESCRIPTION OF THE PREFERRED EMBODIMENTS

The present invention relates to:

a thermoplastic elastomer composition comprising:

an ethylene-based polymer (A); and a propylene-based polymer (B), wherein a melt viscosity of the thermoplastic elastomer composition measured at a temperature of 220° C. and a shear rate of 12 sec$^{-1}$ is 2,500 Pa·sec or less;

the thermoplastic elastomer composition has a sea-island structure; and an island portion has a volume average particle diameter of 2.1 μm or more, and a particle diameter dispersion D of 7.0 or less.

That is, the thermoplastic resin composition of the present invention contains the following components (A) and (B).

Ethylene-Based Polymer (A)

The thermoplastic elastomer composition of the present invention contains an ethylene-based polymer (A).

The ethylene-based polymer (A) is a polymer containing 50 mass % or more of a constitutional unit derived from ethylene. The ethylene-based polymer (A), which contains 50 mass % or more of a constitutional unit derived from ethylene, is a crosslinkable polymer, and thus is suitable for constituting an island portion of a sea-island structure of the thermoplastic elastomer composition by dynamic crosslinking.

As the ethylene-based polymer (A), only one polymer containing 50 mass % or more of a constitutional unit derived from ethylene may be used, or two or more thereof may be used in combination.

The ethylene-based polymer (A) is not particularly limited as long as it contains 50 mass % or more of a constitutional unit derived from ethylene, but it is preferable to use a component (A1) (ethylene random copolymer) and/or a component (A2) (ethylene-α-olefin-non-conjugated diene copolymer) described later.

Ethylene Random Copolymer (A1)

The ethylene random copolymer (A1) that is preferably used as the ethylene-based polymer (A) constituting the thermoplastic elastomer composition according to the present invention is an ethylene random copolymer having 50 mass % or more and 90 mass % or less of a constitutional unit derived from ethylene and a constitutional unit derived from at least one monomer selected from the group consisting of α-olefins having 3 to 10 carbon atoms (provided that the total amount of the ethylene random copolymer is 100 mass %).

The ethylene random copolymer (A1) may have a constitutional unit derived from a monomer other than ethylene and at least one selected from the group consisting of α-olefins having 3 to 10 carbon atoms.

Examples of the α-olefin having 3 to 10 carbon atoms include propylene, 1-butene, 2-methylpropene, 1-pentene, 3-methyl-1-butene, 1-hexene, 4-methyl-1-pentene, and 1-octene. In the preparation of the ethylene random copolymer (A1), the α-olefin having 3 to 10 carbon atoms may be used alone or in combination of two or more. Examples of the constitutional unit derived from at least one selected from the group consisting of α-olefins having 3 to 10 carbon atoms more preferably include a constitutional unit derived from propylene, a constitutional unit derived from 1-butene, and a constitutional unit derived from 1-octene.

The content of the constitutional unit derived from ethylene in the ethylene random copolymer (A1) is 50 mass % or more and 90 mass % or less, preferably 55 mass % or more and 85 mass % or less, and more preferably 60 mass % or more and 75 mass % or less (provided that the total amount of the ethylene random copolymer (A1) is 100 mass %). The content of the constitutional unit derived from at least one selected from the group consisting of α-olefins having 3 to 10 carbon atoms in the ethylene random copolymer (A1) is 10 mass % or more and 50 mass % or less, preferably 15 mass % or more and 45 mass % or less, and more preferably 25 mass % or more and 40 mass % or less (provided that the total amount of the ethylene random copolymer (A1) is 100 mass %).

The content of the constitutional unit derived from ethylene in the ethylene random copolymer (A1) and the content of the constitutional unit derived from at least one monomer selected from the group consisting of α-olefins having 3 to 10 carbon atoms can be determined by infrared spectroscopy. Specifically, the infrared absorption spectrum of the ethylene random copolymer (A1) is measured using an infrared spectrophotometer, and the content of a constitutional unit derived from ethylene and the content of a constitutional unit derived from at least one monomer selected from the group consisting of α-olefins having 3 to 10 carbon atoms are calculated in accordance with the method described in "Characterization of polyethylene by infrared absorption spectrum (Takayama, Usami, et al.)" or "Die Makromolekulare Chemie, 177,461 (1976) (McRae, M. A., MadamS, W. F., et al.)". The content of the constitutional unit derived from ethylene in the component (A1-1) and the component (A1-2) described later and the content of the constituent unit derived from at least one monomer selected from the group consisting of α-olefins having 3 to 10 carbon atoms can also be determined in the same manner.

The ethylene random copolymer (A1) may have a constitutional unit derived from a monomer other than ethylene and at least one selected from the group consisting of α-olefins having 3 to 10 carbon atoms. Examples of another monomer include conjugated dienes having 4 to 8 carbon atoms, such as 1,3-butadiene, 2-methyl-1,3-butadiene, 1,3-pentadiene, and 2,3-dimethyl-1,3-butadiene; non-conjugated dienes having 5 to 15 carbon atoms, such as dicyclopentadiene, 5-ethylidene-2-norbornene, 1,4-hexadiene, 1,5-dicyclooctadiene, 7-methyl-1,6-octadiene, and 5-vinyl-2-norbornene; carboxylic acid vinyl esters such as vinyl acetate; unsaturated carboxylic acid esters such as methyl acrylate, ethyl acrylate, butyl acrylate, methyl methacrylate, and ethyl methacrylate; and unsaturated carboxylic acids such as acrylic acid and methacrylic acid. The other monomer is preferably a non-conjugated diene having 5 to 15 carbon atoms, and more preferably 5-ethylidene-2-norbornene or dicyclopentadiene. The ethylene random copolymer (A1) may contain two or more constitutional units derived from the other monomer.

When the ethylene random copolymer (A1) has a constitutional unit derived from a monomer other than ethylene and at least one selected from the group consisting of α-olefins having 3 to 10 carbon atoms, the content of the constituent unit derived from the other monomer is preferably 30 mass % or less, and more preferably 20 mass % or less (provided that the total amount of the ethylene random copolymer (A1) is 100 mass %). The content of the constitutional unit derived from the other monomer can be determined by infrared spectroscopy. Specifically, the peak intensity of the peak derived from the other monomer of the ethylene random copolymer (A1) is measured using an infrared spectrophotometer. The content of the constitutional unit derived from the other monomer in the ethylene random copolymer (A1) is calculated from the peak intensity. The content of the constitutional unit derived from the other monomer in the component (A1-1) and the component (A1-2) described later can also be determined in the same manner.

Examples of the ethylene random copolymer (A1) include an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, an ethylene-propylene-1-octene copolymer, an ethylene-propylene-5-ethylidene-2-norbornene copolymer, an ethylene-propylene-dicyclopentadiene copolymer, an ethylene-propylene-1,4-hexadiene copolymer, and an ethylene-propylene-5-vinyl-2-norbornene copolymer. The ethylene random copolymer as the component (A1) may be used alone or in combination of two or more. As the component (A1), an ethylene-propylene copolymer or an ethylene-propylene-5-ethylidene-2-norbornene copolymer can be preferably used.

Preferred examples of the ethylene random copolymer (A1) include the following ethylene random copolymer (A1-1) and the following ethylene random copolymer (A1-2).

The ethylene random copolymer (A1-1) (hereinafter, may be referred to as a component (A1-1)) is an ethylene random copolymer that has 50 mass % or more and 90 mass % or less of a constitutional unit derived from ethylene and a constitutional unit derived from at least one monomer selected from the group consisting of α-olefins having 3 to 10 carbon atoms, and that has a gel fraction of more than 10 mass % (provided that the total amount of the ethylene random copolymer is 100 mass %). The component (A1-1) may have a constitutional unit derived from a monomer other than ethylene and at least one selected from the group consisting of α-olefins having 3 to 10 carbon atoms. Specific examples of the α-olefin having 3 to 10 carbon atoms in the component (A1-1), a preferred range of the content of the constitutional unit derived from ethylene in the component (A1-1), a preferred range of the content of the constitutional unit derived from at least one selected from the group consisting of α-olefins having 3 to 10 carbon atoms, specific examples of the constitutional unit derived from the monomer other than ethylene and at least one selected from the group consisting of α-olefins having 3 to and 10 carbon atoms, a preferred range of the content of the other monomer, specific examples of the ethylene random copolymer, and the like are the same as those of the ethylene random copolymer (A1).

As the ethylene random copolymer has more crosslinked structures, the gel fraction increases.

The component (A1-1) can be obtained by crosslinking the component (A1-2) described later. The gel fraction of the component (A1-1) can be determined from the following gel mass of the thermoplastic elastomer composition containing the component (A1-1) and the mass of the component (A1-2) contained in the raw material of the thermoplastic elastomer composition by the following method.

The gel fraction of the component (A1-1) is determined by the method described below using a Soxhlet extractor in which an extraction tube is connected to the lower part of a reflux condenser and a flask is connected to the lower part of the extraction tube. About 1 g of a thermoplastic elastomer composition and an empty mesh basket made of a wire mesh (mesh opening: 400 mesh) are each weighed. The mesh basket enclosing the thermoplastic elastomer composition is introduced into the extraction tube. Then, 300 ml of o-xylene is introduced into the flask. The flask is heated, and o-xylene is refluxed for 24 hours for extraction. After the extraction, the mesh basket containing the extraction residue is taken out from the test tube, and dried under reduced pressure at 100° C. in a vacuum dryer. The dried mesh basket containing the extraction residue is weighed. The gel mass of the thermoplastic elastomer composition is calculated from the mass difference between the mesh basket containing the extraction residue after drying and the empty mesh basket. The gel fraction (mass %) of the component (A1-1) is calculated based on the following equation.

Gel fraction of component (A1-1)=(gel mass of thermoplastic elastomer composition/mass of component (A1-2))×100

The gel fraction of the component (A1-1) is preferably 20 mass % or more, and more preferably 40 mass % or more.

As the ethylene random copolymer has more crosslinked structures, the gel fraction of the thermoplastic elastomer composition also increases.

From the gel mass of the thermoplastic elastomer composition obtained by the same method as described above, the gel fraction of the thermoplastic elastomer composition can be calculated by the following equation.

Gel fraction of thermoplastic elastomer composition=(gel mass of thermoplastic elastomer composition/mass of thermoplastic elastomer composition)×100

The gel fraction of the thermoplastic elastomer composition is preferably 10 mass % or more and 90 mass % or less, more preferably 15 mass % or more and 60 mass % or less, and still more preferably 18 mass % or more and 40 mass % or less.

The component (A1-1) can be obtained by crosslinking the component (A1-2) described later. Examples of the crosslinking method include a method of melt-kneading a composition containing the component (A1-2) and the crosslinking agent (C) described later. The crosslinking may be performed at the same time when the thermoplastic elastomer composition of the present invention is produced. In this case, a composition containing the component (A1-1) and the propylene-based polymer (B) described later can be produced by melt-kneading a composition containing the component (A1-2), the propylene-based polymer (B), and the crosslinking agent (C), and details thereof are as described later.

The ethylene random copolymer (A1-2) (hereinafter, may be referred to as a component (A1-2)) is an ethylene random copolymer that has 50 mass % or more and 90 mass % or less of a constitutional unit derived from ethylene and a constitutional unit derived from at least one monomer selected from the group consisting of α-olefins having 3 to 10 carbon atoms, and that has a gel fraction of 10 mass % or less (provided that the total amount of the ethylene random copolymer is 100 mass %). The component (A1-2) may have a constitutional unit derived from a monomer other than ethylene and at least one selected from the group consisting of α-olefins having 3 to 10 carbon atoms. Specific examples of the α-olefin having 3 to 10 carbon atoms in the component (A1-2), a preferred range of the content of the constitutional unit derived from ethylene in the component (A1-2), a preferred range of the content of the constitutional unit derived from at least one selected from the group consisting of α-olefins having 3 to 10 carbon atoms, specific examples of the constitutional unit derived from the monomer other than ethylene and at least one selected from the group consisting of α-olefins having 3 to 10 carbon atoms, a preferred range of the content of the other monomer, specific examples of the ethylene random copolymer, and the like are the same as those in the case of the ethylene random copolymer (A1).

The gel fraction of the component (A1-2) is preferably 5 mass % or less, and more preferably 0 parts by mass. The component (A1-2) preferably has substantially no cross-linked structure.

The Mooney viscosity ($ML_{1+4}$ 100° C.) of the component (A1-2) measured at 100° C. is preferably 5 or more and 300 or less, more preferably 10 or more and 250 or less, and still more preferably 40 or more and 200 or less. The Mooney viscosity ($ML_{1+4}$ 100° C.) is measured in accordance with JIS K6300, and "$ML_{1+4}$ 100° C." has the following meaning.

M: Mooney viscosity
L: A large rotor was used
100° C.: Measurement temperature
1+4: Measured value when the sample is heated for 1 minute, and then the rotor is rotated at 2 rpm for 4 minutes Examples of the method for producing the component (A1-2) include a method in which ethylene is copolymerized with at least one monomer selected from the group consisting of α-olefins having 3 to 10 carbon atoms in the presence of a known complex-based catalyst such as a Ziegler-Natta-based catalyst, a metallocene-based complex, or a non-metallocene-based complex. Examples of the polymerization method include a slurry polymerization method, a solution polymerization method, a bulk polymerization method, and a gas phase polymerization method.

Ethylene-α-Olefin-Non-Conjugated Diene Copolymer (A2)

In the ethylene-α-olefin-non-conjugated diene copolymer (A2) that is preferably used as the ethylene-based polymer (A), the content of the non-conjugated diene unit is preferably 4 to 15 wt %, and more preferably 6 to 15 wt %. The ethylene-α-olefin-non-conjugated diene copolymer (A2) in the present embodiment is an ethylene-α-olefin-non-conjugated diene copolymer rubber having an A hardness of 85 or less according to JIS K6253.

The α-olefin is preferably an α-olefin having 3 to 20 carbon atoms, and examples thereof include propylene, 1-butene, 2-methylpropylene, 1-pentene, 3-methyl-1-butene, 1-hexene, 4-methyl-1-pentene, and 1-octene; and a combination of two or more thereof. Among them, from the viewpoint of easy availability, propylene or 1-butene is preferable, and propylene is more preferable.

Examples of the non-conjugated diene include chain non-conjugated dienes such as 1,4-hexadiene, 1,6-octadiene, 2-methyl-1,5-hexadiene, 6-methyl-1,5-heptadiene, and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, and 4-ethylidene-8-methyl-1,7-nanodiene. Among them, 5-ethylidene-2-norbornene or dicyclopentadiene is preferable.

When the total of the ethylene unit, the α-olefin unit having 3 to 20 carbon atoms, and the non-conjugated diene unit contained in the ethylene-α-olefin-non-conjugated diene copolymer (A2) is 100 mass %, the amount of the ethylene unit contained in the ethylene-α-olefin-non-conjugated diene copolymer (A2) is usually 30 to 80 mass % and preferably 40 to 80 mass %, and the amount of the α-olefin unit having 3 to 20 carbon atoms is usually 5 to 50 mass % and preferably 15 to 45 mass %. The amount of the non-conjugated diene unit contained in the ethylene-α-olefin-non-conjugated diene copolymer (A2) is 4 to 15 mass %, and preferably 6 to 15 mass % (the total of these three constitutional units is 100 mass %). Specific examples of the preferable ethylene-α-olefin-non-conjugated diene copolymer (A2) include an ethylene-propylene-5-ethylidene-2-norbornene copolymer, an ethylene-propylene-dicyclopentadiene copolymer, an ethylene-propylene-1,4-hexadiene copolymer, and an ethylene-propylene-5-vinyl-2-norbornene copolymer; and a combination of two or more thereof. Among them, an ethylene-propylene-5-ethylidene-2-norbornene copolymer having an ethylene unit content of 40 to 80 mass %, a propylene unit content of 15 to 45 mass %, and a 5-ethylidene-2-norbornene unit content of 6 to 15 mass % is preferable.

The amounts of the ethylene unit, the α-olefin unit having 3 to 20 carbon atoms, and the non-conjugated diene unit contained in the ethylene-α-olefin-non-conjugated diene copolymer (A2) can be determined by infrared spectroscopy (IR method). Specifically, the ethylene-α-olefin-non-conjugated diene copolymer (A2) is formed into a film having a thickness of about 0.5 mm. Then, a peak derived from 5-ethylidene-2-norbornene (absorption peak at 1,688 $cm^{-1}$) of the film is measured using an infrared spectrophotometer, and the amount of the 5-ethylidene-2-norbornene unit in the copolymer is calculated. Next, the copolymer is formed into a film having a thickness of about 0.1 mm. Then, the infrared absorption spectrum of the film is measured with an infrared spectrophotometer, and the ratio of the ethylene unit and the propylene unit is determined in accordance with the method described in the literature (Characterization of polyethylene by infrared absorption spectrum, Takayama, Usami, et. al., or Die Makromolekulare Chemie, 177,461 (1976), Mc Rae, M. A., MadamS, W. F., et. al.). The amounts of the ethylene unit and the propylene unit can be calculated from the ratio and the amount of the 5-ethylidene-2-norbornene unit.

The ethylene-α-olefin-non-conjugated diene copolymer (A2) can be obtained by polymerization by a known method. Examples of the polymerization method include a method of performing polymerization in an inert solvent such as hexane, heptane, toluene, or xylene using a polymerization catalyst such as a Ziegler-Natta catalyst or a metallocene catalyst.

The Mooney viscosity ($ML_{1+4}$ 100° C.) of the ethylene-α-olefin-non-conjugated diene copolymer (A2) is preferably 5 or more and 300 or less, more preferably 10 or more and 250 or less, and still more preferably 50 or more and 200 or less. An olefin-based thermoplastic elastomer composition obtained using the ethylene-α-olefin-non-conjugated diene copolymer (A2) having a Mooney viscosity in the above range can provide a molded article having excellent mechanical strength and an extremely good appearance when molded. The Mooney viscosity ($ML_{1+4}$ 100° C.) is measured in accordance with JIS K6300.

Propylene-Based Polymer (B)

The thermoplastic elastomer composition of the present invention contains a propylene-based polymer (B).

The propylene polymer (B) (hereinafter, may be referred to as a component (B)) contained in the thermoplastic elastomer composition according to the present invention is a propylene (co)polymer having more than 50 mass % and 100 mass % or less of a constitutional unit derived from propylene. The component (B) may have a constitutional unit derived from a monomer other than propylene.

The component (B), which contains 50 mass % or more of a constitutional unit derived from propylene, is a non-crosslinkable or degradable polymer as compared with the component (A), and thus is suitable for constituting a sea portion of a sea-island structure of the thermoplastic elastomer composition.

Examples of the monomer other than propylene include ethylene and an α-olefin having 4 or more carbon atoms, and ethylene and an α-olefin having 4 to 20 carbon atoms are preferable.

Examples of the α-olefin having 4 to 20 carbon atoms include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene.

The content of the constitutional unit derived from propylene, the content of the constitutional unit derived from ethylene, and the content of the constitutional unit derived from at least one monomer selected from the group consisting of α-olefins having 4 or more carbon atoms in the propylene-based polymer (B) can be determined by the same method as the content of each constitutional unit in the ethylene-based polymer (A).

Examples of the propylene-based polymer (B) include a propylene homopolymer, a propylene random copolymer, and a heterophasic propylene polymer material. The thermoplastic elastomer composition according to the present invention may contain only one or two or more propylene-based polymers (B).

Preferable examples of the propylene random copolymer include:

(1) a propylene-ethylene random copolymer in which the content of a constitutional unit derived from propylene is 90 mass % or more and 99.5 mass % or less, and the content of a constitutional unit derived from ethylene is 0.5 mass % or more and 10 mass % or less (the total amount of the constitutional unit derived from propylene and the constitutional unit derived from ethylene is 100 mass %);

(2) a propylene-ethylene-α-olefin random copolymer in which the content of a propylene unit is 81 mass % or more and 99 mass % or less, the content of a constitutional unit derived from ethylene is 0.5 mass % or more and 9.5 mass % or less, and the content of a constitutional unit derived from an α-olefin having 4 to 10 carbon atoms is 0.5 mass % or more and 9.5 mass % or less (the total amount of the constitutional unit derived from propylene, the constitutional unit derived from ethylene, and the constitutional unit derived from an α-olefin having 4 to 10 carbon atoms is 100 mass %); and (3) a propylene-α-olefin random copolymer in which the content of a constitutional unit derived from propylene is 90 mass % or more and 99.5 mass % or less, and the content of a constitutional unit derived from an α-olefin having 4 to 10 carbon atoms is 0.5 mass % or more and 10 mass % or less (provided that the total amount of the constitutional unit derived from propylene and the constitutional unit derived from an α-olefin having 4 to 10 carbon atoms is 100 mass %).

Examples of the α-olefin having 4 to 10 carbon atoms in the above (1) and (2) include linear α-olefins such as 1-butene, 1-pentene, 1-hexene, 1-octene, and 1-decene; and branched α-olefins such as 3-methyl-1-butene and 3-methyl-1-pentene. In the preparation of the above (1) and (2), the α-olefin having 4 to 10 carbon atoms may be used alone or in combination of two or more.

Examples of the method for producing a propylene homopolymer and a propylene random copolymer include a method in which propylene (and another monomer as necessary) is polymerized in the presence of a Ziegler-Natta catalyst or a complex-based catalyst such as a metallocene complex or a non-metallocene complex. Examples of the polymerization method include a slurry polymerization method, a solution polymerization method, a bulk polymerization method, and a gas phase polymerization method.

In the present specification, the term "heterophasic propylene polymer material" refers to a mixture having a structure in which a copolymer (II) is dispersed in a matrix of a polymer (I). The polymer (I) has more than 80 mass % and 100% or less of a constitutional unit derived from propylene (provided that the total mass of the polymer is 100 mass %) (hereinafter, may be simply referred to as a "polymer (I)"

and the copolymer (II) has 20 mass % or more and 90 mass % or less of a constitutional unit derived from ethylene and a constitutional unit derived from at least one monomer selected from the group consisting of α-olefins having 3 or more carbon atoms (provided that the total mass of the copolymer is 100 mass %) (hereinafter, simply referred to as a "copolymer (II)").

In the heterophasic propylene polymer material as the component (B), the content of the constitutional unit derived from propylene is 50 mass % or more based on 100 mass % of the total amount of the heterophasic propylene polymer material.

The content of the polymer (I) contained in the heterophasic propylene polymer material is preferably 70 mass % or more and 90 mass % or less, and more preferably 75 mass % or more and 90 mass % or less (provided that the total amount of the heterophasic propylene polymer material is 100 mass %). The content of the copolymer (II) contained in the heterophasic propylene polymer material is preferably 10 mass % or more and 30 mass % or less, and more preferably 10 mass % or more and 25 mass % or less (provided that the total amount of the heterophasic propylene polymer material is 100 mass %).

Examples of the α-olefin having 3 or more carbon atoms in the copolymer (II) include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. The α-olefin having 3 or more carbon atoms is preferably an α-olefin having 3 to 20 carbon atoms, more preferably an α-olefin having 3 to 10 carbon atoms, and still more preferably propylene, 1-butene, 1-hexene, or 1-octene. In the copolymer (II), the α-olefin having 3 or more carbon atoms may be used alone or in combination of two or more.

The content of the constitutional unit derived from ethylene contained in the copolymer (II) is preferably 22 mass % or more and 80 mass % or less, more preferably 25 mass % or more and 70 mass % or less, and still more preferably 27 mass % or more and 60 mass % or less (provided that the total amount of the constitutional unit derived from at least one selected from the group consisting of α-olefins having 3 or more carbon atoms and the constitutional unit derived from ethylene is 100 mass %). The content of the constituent unit derived from at least one monomer selected from the group consisting of α-olefins having 3 or more carbon atoms contained in the copolymer (II) is preferably 20 mass % or more and 78 mass % or less, more preferably 30 mass % or more and 75 mass % or less, and still more preferably 40 mass % or more and 73 mass % or less (provided that the total amount of the constitutional unit derived from at least one monomer selected from the group consisting of α-olefins having 3 or more carbon atoms and the constitutional unit derived from ethylene is 100 mass %).

Examples of the copolymer (II) include a propylene-ethylene copolymer, an ethylene-1-butene copolymer, an ethylene-1-hexene copolymer, an ethylene-1-octene copolymer, a propylene-ethylene-1-butene copolymer, a propylene-ethylene-1-hexene copolymer, and a propylene-ethylene-1-octene copolymer. A propylene-ethylene copolymer or a propylene-ethylene-1-butene copolymer is preferable. The copolymer (II) is usually a random copolymer.

Examples of the method for producing the heterophasic propylene polymer material as the component (B) include a method in which monomers containing propylene, ethylene, and the like are polymerized in multiple stages in the presence of a polymerization catalyst. Examples thereof include a method in which the polymer (I) is produced by polymerizing a monomer containing propylene in the presence of a polymerization catalyst in the first polymerization step using a polymerization catalyst, and then the copolymer (II) is produced by copolymerizing ethylene and at least one monomer selected from the group consisting of α-olefins having 3 or more carbon atoms in the presence of the polymer (I) obtained in the first polymerization step, in the second polymerization step. Examples of the polymerization catalyst used in the production of the heterophasic propylene polymer material include a Ziegler catalyst, a Ziegler-Natta catalyst, a catalyst containing an alkylaluminoxane and a transition metal compound of group 4 of the periodic table having a cyclopentadienyl ring, a transition metal compound of group 4 of the periodic table having a cyclopentadienyl ring, a compound that reacts with the transition metal compound to form an ionic complex, and a catalyst containing an organic aluminum compound. In addition, a prepolymerization catalyst may be used in the presence of the polymerization catalyst. Examples of the prepolymerization catalyst include catalysts described in JP-A-61-218606, JP-A-61-287904, JP-A-5-194685, JP-A-7-216017, JP-A-9-316147, JP-A-10-212319, and JP-A-2004-182981.

Examples of the polymerization method in the production of the heterophasic propylene polymer material as the component (B) include bulk polymerization, solution polymerization, slurry polymerization, and gas phase polymerization. Examples of the inert hydrocarbon solvent used in the solution polymerization and the slurry polymerization include propane, butane, isobutane, pentane, hexane, heptane, and octane. Two or more of these polymerization methods may be combined, and the polymerization method may be either a batch type or a continuous type. As a polymerization method in the production of the heterophasic propylene polymer material, bulk-gas phase polymerization in which continuous gas phase polymerization, bulk polymerization, and gas phase polymerization are continuously performed is preferable.

The melt flow rate (MFR) of the propylene-based polymer (B) measured under conditions of a temperature of 230° C. and a load of 21.18 N in accordance with JIS K7210 is preferably 1.0 g/10 min or more and 200 g/10 min or less from the viewpoint of bondability to another member and the like. The melt flow rate of the propylene-based polymer (B) is more preferably 4.0 g/10 min or more and 150 g/10 min or less, and still more preferably 10 g/10 min or more and 105 g/10 min or less.

The intrinsic viscosity (hereinafter, referred to as $[\eta_{cxis}]$) of an insoluble portion in xylene at 20° C. (hereinafter, referred to as a CXIS portion) of the propylene-based polymer (B) is preferably 0.1 dl/g or more and 6.0 dl/g or less, more preferably 0.3 dl/g or more and 5.0 dl/g or less, and still more preferably 0.3 dl/g or more and 2.9 dl/g or less.

The intrinsic viscosity can be determined in accordance with the following procedure. The reduced viscosity is measured in tetralin at 135° C. using an Ubbelohde viscometer, and the intrinsic viscosity is determined from the obtained reduced viscosity by an extrapolation method in accordance with the calculation method described on page 491 of "Polymer Solution, Polymer Experiment Study vol. 11" (published by Kyoritsu Shuppan Co., Ltd., 1982).

Here, the CXS portion and the CXIS portion are obtained by the following method. About 5 g of the propylene-based polymer (B) is completely dissolved in 500 ml of boiling xylene. The obtained xylene solution is slowly cooled to 20° C., the state is adjusted at 20° C. for 4 hours or more, and the precipitate and the solution are separated by filtration. The precipitate is the CXIS portion. A product obtained by removing the solvent from the solution is a xylene soluble portion (CXS portion) at 20° C.

The propylene-based polymer (B) is preferably a propylene homopolymer, a propylene-ethylene random copolymer, a propylene-ethylene-1-butene random copolymer, or a heterophasic propylene polymer material, and particularly preferably a propylene homopolymer, an ethylene-propylene random copolymer, or a heterophasic propylene polymer material.

Crosslinking Agent (C)

The thermoplastic elastomer composition of the present invention having a sea-island structure is preferably produced through a step of melt-kneading the ethylene-based polymer (A) and the propylene-based polymer (B) in the presence of a crosslinking agent (C).

As the crosslinking agent (C) preferably used in the present embodiment, a crosslinking agent usually used for crosslinking rubber can be used. Examples thereof include organic peroxides, phenolic resins, sulfur, sulfur-containing compounds, p-quinone, derivatives of p-quinone dioxime, bismaleimide compounds, epoxy compounds, silane compounds, and amino resins. Among them, an organic peroxide is preferable.

Examples of the organic peroxide include ketone peroxides, diacyl peroxides, hydroperoxides, dialkyl peroxides, peroxyketals, alkyl peresters, percarbonates, peroxydicarbonates, and peroxyesters.

Specific examples of the organic peroxide include dicumyl peroxide, 2,5-dimethyl-2,5-di(tert-butylperoxy)hexane, 2,5-dimethyl-2,5-di(tert-butylperoxy)hexyne, 1,3-bis(tert-butylperoxyisopropyl)benzene, tert-butylcumyl peroxide, di-tert-butyl peroxide, 2,2,4-trimethylpentyl-2-hydroperoxide, diisopropylbenzo hydroperoxide, cumene peroxide, tert-butyl peroxide, 1,1-di(tert-butylperoxy)3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide.

The organic peroxide may be used alone or in combination of two or more.

The organic peroxide used in the present embodiment may have any shape such as a liquid, a powder, or a pellet. In addition, in order to improve the dispersibility, it is more preferable to dilute the organic peroxide with a diluent such as an inorganic filler, a mineral oil, or a solvent inert to the crosslinking reaction for use. For the addition method, the organic peroxide is more preferably added in a liquid state.

In particular, paraffinic oils are preferable diluents in consideration of their handleability and influence on products.

In order to uniformly and slowly progress the crosslinking reaction, an organic peroxide and a crosslinking aid may be used in combination. As the crosslinking aid, a polyfunctional compound such as a sulfur-based compound, a methacrylate-based compound, or a maleimide-based compound can be blended. Examples of the crosslinking aid include sulfur, p-quinone dioxime, p,p'-dibenzoylquinone dioxime, ethylene glycol dimethacrylate, diethylene glycol dimethacrylate, triethylene glycol dimethacrylate, tetraethylene glycol dimethacrylate, polyethylene glycol dimethacrylate, trimethylolpropane trimethacrylate, diallyl phthalate, tetraallyloxyethane, triallyl isocyanurate, N,N'-m-phenylene bismaleimide, maleic anhydride, divinylbenzene, zinc diacrylate, and zinc dimethacrylate. Among them, N,N'-m-phenylene bismaleimide, p,p'-dibenzoylquinone dioxime, divinylbenzene, trimethylolpropane trimethacrylate, or triallyl isocyanurate is preferable. N,N'-m-phenylene bismaleimide alone can also be used as a crosslinking agent.

Examples of the phenolic resin used as the crosslinking agent (C) include a compound represented by the following formula, which is generally used as a crosslinking agent for rubber (see U.S. Pat. Nos. 3,287,440 B and 3,709,840 B):

[Chemical Formula 1]

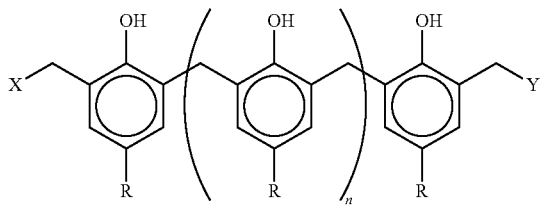

wherein n is an integer of 0 to 10; X and Y are each independently a hydroxyl group, a halogenated alkyl group, or a halogen atom; and R is a saturated hydrocarbon group having 1 to 15 carbon atoms. The compound can be produced by condensation polymerization of a substituted phenol and an aldehyde with an alkali catalyst.

Examples of the phenol resin include alkylphenol-formaldehyde and brominated alkylphenol-formaldehyde.

When the phenol resin is used as the crosslinking agent, it may be combined with a crosslinking accelerator in order to adjust the rate of the crosslinking reaction. Examples of the crosslinking accelerator include metal halides such as stannous chloride and ferric chloride; and organic halides such as chlorinated polypropylene, brominated butyl rubber, and chloroprene rubber.

The phenol resin is preferably used in combination with a dispersant such as a metal oxide (for example, zinc oxide) and stearic acid.

The addition amount of the crosslinking agent (C) is not particularly limited, and those skilled in the art can appropriately set the addition amount of the crosslinking agent (C) suitable for carrying out crosslinking of the ethylene-based polymer (A) and the like at a desired level.

The crosslinking agent (C) may be decomposed in a process for crosslinking the ethylene-based polymer (A) or the like, such as melt-kneading. Thus, the preferred amount of the crosslinking agent (C) is generally specified not by the amount of the crosslinking agent (C) remaining in the thermoplastic elastomer composition of the present invention, but by the amount of the crosslinking agent (C) before melt-kneading the ethylene-based polymer (A) and the propylene-based polymer (B) in the presence of the crosslinking agent (C).

The amount of the crosslinking agent (C) before melt-kneading is preferably 0.001 parts by mass or more and 3.0 parts by mass or less, more preferably 0.01 parts by mass or more and 2.0 parts by mass or less, and still more preferably 0.1 parts by mass or more and 1.0 parts by mass or less, based on 100 parts by mass of the total amount of the ethylene-based polymer (A) and the propylene-based polymer (B).

When the crosslinking aid is used together with the crosslinking agent (C), the amount of the crosslinking aid before melt-kneading is preferably 0.01 parts by mass or more and 10 parts by mass or less, and more preferably 0.05 parts by mass or more and 1.0 parts by mass or less, based on 100 parts by mass of the total amount of the ethylene-based polymer (A) and the propylene-based polymer (B).

Mineral Oil (D)

The thermoplastic elastomer composition of the present invention may contain a mineral oil (D).

The mineral oil (D) may be mixed with the ethylene-based polymer (A), that is, the ethylene-based polymer (A) may be oil-extended with the mineral oil (D).

Examples of the mineral oil (D) preferably used as a softener in the present embodiment include high boiling point fractions (average molecular weight: 300 to 1500, pour point: 0° C. or less) of petroleum such as aromatic mineral oil, naphthenic mineral oil, and paraffinic mineral oil. Among them, paraffinic mineral oil is preferable.

It is desirable that the mineral oil (D) is added as an extender oil to the ethylene-based polymer (A), particularly preferably the ethylene-α-olefin-non-conjugated diene copolymer (A2). The addition method may be a known method, and examples thereof include (1) a method in which both components are mechanically kneaded using a kneading apparatus such as a roll or a Banbury mixer, and (2) a method in which the component (D) is added to a solution of the component (A) produced in a form of solution, and then the solvent is removed by a method such as steam stripping.

When the mineral oil (D) is blended as an extender oil of the ethylene-based polymer (A), the Mooney viscosity ($ML_{1+4}$ 100° C.) measured at 100° C. of the composition containing the mineral oil (D) and the ethylene-based polymer (A) (oil-extended polymer) is preferably 5 or more and 300 or less, more preferably 10 or more and 250 or less, and still more preferably 40 or more and 200 or less. The Mooney viscosity ($ML_{1+4}$ 100° C.) is measured in accordance with JIS K6300.

From the viewpoint of achieving the above Mooney viscosity or the like, the addition amount of the mineral oil (D) is preferably 20 to 80 parts by mass, more preferably 30 to 70 parts by mass, and still more preferably 40 to 60 parts by mass, based on 100 parts by mass of the total amount of the ethylene-based polymer (A) and the mineral oil (D).

Other Components

The thermoplastic elastomer composition of the present invention may contain various additives in addition to the ethylene-based polymer (A) and the propylene-based polymer (B) (and the crosslinking agent (C) and/or the mineral oil (D), if present) which are essential components.

Examples of the additive that may be contained include a polymer or oligomer other than the components (A) and (B), a softener other than the mineral oil (D), an inorganic filler (talc, calcium carbonate, calcined kaolin, glass fiber, hollow glass sphere, silica, metal soap, titanium dioxide, mica, potassium titanate fiber, and the like), an organic filler (fiber, wood powder, cellulose powder, carbon fiber, carbon black, and the like), a lubricant (fatty acid amide, silicone oil, silicone gum, and the like), an antioxidant (phenol-based, sulfur-based, phosphorus-based, lactone-based, vitamin-based, and the like), a weathering stabilizer, an ultraviolet absorber (benzotriazole-based, triazine-based, anilide-based, benzophenone-based, and the like), a heat stabilizer, a photostabilizer (hindered amine-based, benzoate-based, and the like), a pigment (inorganic pigment, organic pigment, pigment dispersant, and the like), a nucleating agent, a foaming agent, a foaming nucleating agent, a plasticizer, a flame retardant, a brightening agent, an antibacterial agent, a light diffusing agent, an adsorbent (metal oxide (zinc oxide, magnesium oxide, and the like), a wet dispersant, a VOC/odor stripping agent, a water storage agent (aqueous medium containing an amphiphilic polymer, and the like), a scratch resistance improver, a metal chloride (iron chloride, calcium chloride, and the like), hydrotalcite, and an aluminate. These additives may be used alone or in combination of two or more.

Examples of the resin other than the components (A) and (B) include an olefin-based resin (provided that those corresponding to the components (A) and (B) are excluded), an olefin-based elastomer (provided that those corresponding to the components (A) and (B) are excluded), a hydrogenated product of a block copolymer containing a polymer block of a monovinyl-substituted aromatic hydrocarbon compound and a polymer block of a conjugated diene compound, a polyphenylene ether-based resin, a polyamide-based resin, a polyester-based resin, a polyoxymethylene-based resin, and a polymethyl methacrylate-based resin.

Thermoplastic Elastomer Composition

The thermoplastic elastomer composition of the present invention preferably contains 30 to 80 parts by mass of the ethylene-based polymer (A) and 20 to 70 parts by mass of the propylene-based polymer (B), based on 100 parts by mass of the total amount of the ethylene-based polymer (A) and the propylene-based polymer (B).

The content of the ethylene-based polymer (A) is more preferably 40 to 75 mass %, and particularly preferably 50 to 70 mass %.

The content of the propylene-based polymer (B) is more preferably 25 to 60 mass %, and particularly preferably 30 to 50 mass %.

In the thermoplastic elastomer composition of the present invention, the melt viscosity measured at a temperature of 220° C. and a shear rate of 12 $\sec^{-1}$ is 2,500 Pa·sec or less.

When the melt viscosity is 2,500 Pa·sec or less, the thermoplastic elastomer composition of the present invention has high fluidity when molded by injection molding or the like, has excellent moldability, has a good appearance of molded article such as surface smoothness, and has excellent bondability to another member.

The melt viscosity can be measured by melting a thermoplastic elastomer composition at a predetermined temperature and measuring the melt viscosity at a predetermined shear rate in accordance with a method known in the art. More specifically, the melt viscosity can be measured, for example, by the method described in Examples of the present application.

The melt viscosity can be appropriately increased or decreased by adjusting the content ratio and the melt flow rate of the propylene-based polymer (B) used in the thermoplastic elastomer composition, the proportion and the particle diameter of the island portion of the sea-island structure usually composed of the ethylene-based polymer (A), the gel fraction, and the like.

The melt viscosity is preferably 500 to 2,500 Pa·sec, more preferably 800 to 2,300 Pa·sec, and particularly preferably 1,000 to 2,000 Pa·sec.

The thermoplastic elastomer composition of the present invention has a sea-island structure. As described above, since the ethylene-based polymer (A) is a crosslinkable polymer containing 50 mass % or more of a constitutional unit derived from ethylene, the island portion of the sea-island structure is usually mainly composed of the ethylene-based polymer (A). Similarly, as described above, since the propylene-based polymer (B) contains 50 mass % or more of a constitutional unit derived from propylene (as compared with the component (A)) and is a non-crosslinkable or degradable polymer, the sea portion of the sea-island structure is usually mainly composed of the propylene-based polymer (B).

The volume average particle diameter of the island portion of the sea-island structure is 2.1 μm or more.

When the volume average particle diameter of the island portion of the sea-island structure is equal to or more than the predetermined value, the proportion of the sea portion in the surface of the molded article obtained using the thermoplastic elastomer composition of the present invention or the interface between another member increases. This improves appearance such as surface smoothness of the molded article, and also improves bondability to another member (particularly, a member containing a propylene-based resin).

The volume average particle diameter of the island portion can be measured by analyzing an image of a surface or an interface acquired by a scanning electron microscope in accordance with a method known in the art. More specifically, the volume average particle diameter can be measured, for example, by the method described in Examples of the present application.

The particle diameter of the island portion of the sea-island structure can be appropriately adjusted by adjusting the melt viscosity ratio of the ethylene-based polymer (A) and the propylene-based polymer (B).

More specifically, when the viscosity of the ethylene-based polymer (A) and the viscosity of the propylene-based polymer (B) during melt-kneading are close to each other, the ethylene-based polymer (A) and the propylene-based polymer (B) are well mixed with each other, and as a result, the particle diameter of the island portion is small.

Conversely, when the difference between the viscosity of the ethylene-based polymer (A) and the viscosity of the propylene-based polymer (B) is large, the ethylene-based polymer (A) and the propylene-based polymer (B) are hardly mixed with each other, and as a result, the particle diameter of the island portion is large.

In the thermoplastic elastomer composition of the present invention, since the melt viscosity of the ethylene-based polymer (A) is usually higher than the melt viscosity of the propylene-based polymer (B). In such a case, by selecting a propylene-based polymer (B) having a low melt viscosity (having a large MFR), the difference between the viscosity of the ethylene-based polymer (A) and the viscosity of the propylene-based polymer (B) can be expanded, so that the particle diameter of the island portion can be made large. It is also preferable to use a propylene-based polymer having a low melt viscosity (having a large MFR) from the viewpoint of reducing the melt viscosity.

When the ethylene-based polymer (A) is crosslinked with a peroxide or the like at the time of melt-kneading in the production of the thermoplastic elastomer composition, the melt viscosity of the ethylene-based polymer (A) tends to increase due to crosslinking, and the melt viscosity of the propylene-based polymer (B) tends to decrease due to, for example, cleavage of a molecular chain by a peroxide or the like. Therefore, in order to adjust the particle diameter of the island portion of the sea-island structure to a desired value, it is preferable to set the melt viscosities of the ethylene-based polymer (A) and the propylene-based polymer (B) in consideration of the above tendency.

In addition, the particle diameter of the island portion of the sea-island structure can also be appropriately adjusted by adjusting the strength of melt-kneading when the thermoplastic elastomer composition is produced.

More specifically, the ethylene-based polymer (A) and the propylene-based polymer (B) are well mixed with each other by strong melt-kneading, and as a result, the particle diameter of the island portion becomes small. On the other hand, by weakly performing melt-kneading, the particle diameter of the island portion becomes large.

The strength of the melt-kneading can be specified by the specific energy (kWh/kg) calculated by dividing the power consumption (kW) by the melt-kneading by the discharge rate (kg/h) of the melt-kneaded thermoplastic elastomer composition.

The specific energy is preferably 0.27 (kWh/kg) or less, and particularly preferably 0.1 or more and 0.25 (kWh/kg) or less.

The volume average particle diameter of the island portion of the sea-island structure is preferably 2.1 µm or more, more preferably 2.5 µm or more, and particularly preferably 3.0 µm or more.

As described above, when the volume average particle diameter of the island portion of the sea-island structure is a predetermined value or more, bondability and adhesive strength with another member are improved. On the other hand, when particles having an excessive particle diameter are present, stress concentrates on the interface of such particles, and conversely, the adhesive strength may be reduced. From such a viewpoint, the volume average particle diameter of the island portion of the sea-island structure is preferably 10 µm or less, more preferably 8.0 µm or less, and particularly preferably 6.0 µm or less.

The particle diameter dispersion of the island portion of the sea-island structure is 7.0 or less.

The fact that the particle diameter dispersion is a predetermined value or less means that the distribution of the particle diameter is uniform. At this time, there is a low possibility that particles having an excessive particle diameter are present. It is therefore possible to effectively suppress problems such as a decrease in adhesive strength due to concentration of stress at the interface between particles.

The particle diameter dispersion D of the island portion is defined as a ratio Rv/Rn of the volume average particle diameter Rv to the number average particle diameter Rn. The particle diameter dispersion D can be determined by analyzing an image of a surface or an interface acquired by a scanning electron microscope or the like in accordance with a method known in the art. More specifically, the particle diameter dispersion D can be determined, for example, by the method described in Examples of the present application.

The particle diameter dispersion of the island portion can be appropriately adjusted by adjusting the melt viscosity of the propylene-based polymer (B) and the conditions of melt-kneading in the production of the thermoplastic elastomer composition.

For example, by selecting a propylene-based polymer (B) having a low melt viscosity (having a large MFR) or inputting high specific energy during melt-kneading, the particle diameter can be made uniform and the particle diameter dispersion can be made small.

The particle diameter dispersion of the island portion of the sea-island structure is preferably 7.0 or less, and particularly preferably 6.5 or less.

There is no particular lower limit to the particle diameter dispersion of the island portion of the sea-island structure, but the particle diameter dispersion is 1 or more by definition. In the case of production in a normal process, the particle diameter dispersion is preferably 1.1 or more, more preferably 1.5 or more, and more preferably 1.7 or more.

The method for producing the thermoplastic elastomer composition of the present invention is not particularly limited, but the thermoplastic elastomer composition can be produced by kneading the ethylene-based polymer (A) and the propylene-based polymer (B), which are raw materials of the thermoplastic elastomer composition, and various additives as desired by a conventional method using an ordinary extruder, a Banbury mixer, a roll, a Brabender plastgraph, a Brabender kneader, or the like. It is preferable to produce the thermoplastic elastomer composition by melt-kneading using an extruder, particularly a twin-screw extruder.

In the production of the thermoplastic elastomer composition of the present invention, crosslinking may be performed or may not be performed. It is preferable to perform crosslinking from the viewpoint of controlling the sea-island structure, melt viscosity, and the like.

In a preferred production method in the case of performing crosslinking, a step of melt-kneading the ethylene-based polymer (A) and the propylene-based polymer (B) in the presence of the crosslinking agent (C) is preferably performed.

At this time, the Mooney viscosity ($ML_{1+4}$ 100° C.) of the ethylene-based polymer (A) is preferably 40 or more, and the melt flow rate of the propylene-based polymer (B) measured under conditions of a temperature of 230° C. and a load of 21.18 N is preferably 1.0 to 200 g/10 min.

When the ethylene-based polymer (A) is oil-extended with the mineral oil (D), a step of melt-kneading the oil-extended polymer and the propylene-based polymer (B) in the presence of the crosslinking agent (C) is preferably performed. The Mooney viscosity ($ML_{1+4}$ 100° C.) of the oil-extended polymer is preferably 40 or more, and the melt flow rate of the propylene-based polymer (B) measured under conditions of a temperature of 230° C. and a load of 21.18 N is preferably 1.0 to 200 g/10 min.

By using the ethylene-based polymer (A) or the oil-extended polymer and the propylene-based polymer (B) satisfying such conditions, the thermoplastic elastomer composition of the present invention in which the island portion has a specific volume average particle diameter and particle diameter dispersion can be efficiently or easily produced.

From the viewpoint of more efficiently or easily producing the thermoplastic elastomer composition of the present invention, the specific energy defined by power consumption (kW)/discharge rate (kg/h) by melt-kneading in the melt-kneading step is preferably 0.27 (kWh/kg) or less.

The above production method can be suitably used for producing the thermoplastic elastomer composition of the present invention, but is also suitable for producing other thermoplastic elastomer compositions.

The thermoplastic elastomer composition of the present invention is used for various applications, and is particularly preferably used for constituting a part or all of various members and products produced by injection molding or extrusion molding.

When the thermoplastic elastomer composition of the present invention is used, an extrusion-molded article or an injection-molded article having good surface smoothness can be obtained. Thus, the thermoplastic elastomer composition can be particularly preferably used in applications in which a smooth appearance of the molded article is required.

The surface smoothness can be evaluated, for example, by measuring the ten-point average roughness of the surface of the molded article.

The ten-point average roughnesses of the surfaces of the extrusion-molded article and the injection-molded article of the present embodiment are preferably 15 μm or less, and particularly preferably 10 μm or less. Since the ten-point average roughness of the surface is generally preferably as small as possible, there is no particular lower limit. However, in the case of producing a thermoplastic elastomer composition at a practical cost and further producing a molded article, the ten-point average roughness is usually 1.0 μm or more in many cases.

Furthermore, the thermoplastic elastomer composition of the present invention is excellent in bondability to another member, particularly a member composed of a thermoplastic elastomer composition using a propylene-based polymer for the sea portion, and thus can be particularly preferably used in the production of a composite molded article with such a member.

More specifically, examples of preferable applications of the thermoplastic elastomer composition of the present invention include various automobile interior and exterior parts such as glass run channels, weather strips, door grommets, instrument panels, glove boxes, trims, housings, pillars, bumpers, fenders, and back doors, as well as various parts of household electric appliances, various housing equipment parts, various industrial parts, and various building material parts, but are not limited thereto.

An injection-molded article as a preferred embodiment of the present invention can be produced by using the thermoplastic elastomer composition of the present invention, for example, by an ordinary injection molding method or various molding methods as necessary, such as a gas injection molding method, an injection compression molding method, and a short shot foam molding method. The molding conditions in the injection molding are not particularly limited, but the molding can be generally performed at a molding temperature of 100 to 300° C., preferably 180 to 280° C., an injection pressure of 5 to 100 MPa, preferably 10 to 80 MPa, and a mold temperature of 20 to 80° C., preferably 20 to 60° C.

The injection-molded article, which is a preferred embodiment of the present invention, may be bonded to another member by utilizing its excellent bondability to form a composite molded article. As another member at that time, it is preferable to use a molded article containing a thermoplastic elastomer composition of the same type as that of the present invention, particularly a molded article containing a thermoplastic elastomer composition in which the sea portion of the sea-island structure is composed of a propylene-based polymer, and at this time, more excellent bondability can be achieved.

The bonding strength with another member in this embodiment is preferably 3.5 MPa or more, more preferably 3.8 MPa or more, and particularly preferably 4.0 MPa or more.

The bonding strength with another member is preferably as high as possible, and there is no particular upper limit. However, when a composite molded article is produced at a practical cost, the bonding strength is usually 6.0 MPa or less in many cases.

In the production of the composite molded article of the present embodiment, it is preferable to produce a composite molded article by disposing another member such as an extrusion-molded article in a mold, then injection-molding the thermoplastic elastomer composition of the present invention in the mold, and bonding the injection-molded article to the other member. For example, by disposing a main body portion (linear portion) of a glass run channel as the extrusion-molded article in a mold for injection molding, and then injection-molding the thermoplastic elastomer composition of the present invention to form a corner portion bonded to the main body portion. Thus, a glass run channel excellent in appearance, bonding strength between the main body portion and the corner portion, and the like can be produced.

EXAMPLES

Hereinafter, the present invention will be described in more detail based on Examples, but the present invention is not limited to these Examples.

The physical properties and characteristics in Examples and Comparative Examples were evaluated by the following methods.

(1) Mooney Viscosity ($ML_{1+4}$ 100° C.)

The Mooney viscosity of the ethylene-based polymer (A) (when the ethylene-based polymer (A) is oil-extended with the mineral oil (D), an oil-extended polymer containing the ethylene-based polymer (A) and the mineral oil (D)) was measured at a temperature of 100° C. in accordance with JIS K6300.

(2) Melt Flow Rate (MFR, Unit: g/10 Min)

The MFR of the ethylene-based polymer (A) was measured in accordance with JIS K7210 under conditions of a temperature of 190° C. and a load of 21.18 N.

The MFR of the propylene-based polymer (B) was measured in accordance with JIS K7210 under conditions of a temperature of 230° C. and a load of 21.18 N.

(3) Composition of Ethylene-Propylene-5-Ethylidene-2-Norbornene Copolymer (Ethylene-Based Polymer (A))

The measurement was performed by infrared spectroscopy (IR method). Specifically, an ethylene-propylene-5-ethylidene-2-norbornene copolymer was formed into a film having a thickness of about 0.5 mm. Then, the intensity of a peak derived from 5-ethylidene-2-norbornene (absorption peak at 1,688 $cm^{-1}$) of the film was measured using an infrared spectrophotometer, and the content of a constitutional unit derived from 5-ethylidene-2-norbornene in the copolymer was calculated. Next, an ethylene-propylene-5-ethylidene-2-norbornene copolymer was newly formed into a film having a thickness of about 0.1 mm. Then, the infrared absorption spectrum of the film was measured using an infrared spectrophotometer, and the content of a constitutional unit derived from ethylene and the content of a constitutional unit derived from propylene were calculated in accordance with the method described in the literature (Characterization of polyethylene by infrared absorption spectrum: Takayama, Usami, et al., or Die Makromolekulare Chemie, 177,461 (1976) by Mc Rae, M. A., MadamS, W. F., et al.).

(4) Intrinsic Viscosity of Xylene Insoluble Portion of Propylene-Based Polymer (B) ([$\eta_{cxis}$], Unit: Dl/g)

About 5 g of a sample of a propylene-based polymer (B) was completely dissolved in 500 ml of boiling xylene. Then, the xylene solution was slowly cooled to 20° C. and conditioned at 20° C. for 4 hours or more. Thereafter, the precipitate and the solution were separated by filtration. The precipitate was defined as a CXIS portion.

The reduced viscosity was measured in tetralin at 135° C. using an Ubbelohde viscometer, and the intrinsic viscosity was determined from the obtained reduced viscosity by an extrapolation method in accordance with the calculation method described on page 491 of "Polymer Solution, Polymer Experiment Study vol. 11" (published by Kyoritsu Shuppan Co., Ltd., 1982).

(5) Melt Viscosity of Thermoplastic Elastomer Composition

Using a capillary rheometer (Capilograph 1C manufactured by Toyo Seiki Seisaku-sho, Ltd.), a molten thermoplastic elastomer composition was extruded from an orifice having a diameter of 1 mm and a length of 40 mm under conditions of a temperature of 220° C. and a shear rate of 12.16 sec$^{-1}$. The melt viscosity of the thermoplastic elastomer composition was then measured.

(6) Volume Average Particle Diameter and Particle Diameter Dispersion of Domain (Island Portion)

Images for analysis were acquired using a scanning electron microscope (SEM). For sample preparation, pellets of each of thermoplastic elastomer compositions produced in Examples and Comparative Examples described later were exposed in cross section with a cryomicrotome, and stained with a 1% ruthenium tetroxide (RuO$_4$) aqueous solution for 90 minutes. Then, an ultrathin section having a thickness of about 150 nm was obtained with the cryomicrotome, and the section was supported on a Cu mesh to prepare an observation sample. As the SEM, HITACHI SU8020 manufactured by Hitachi High-Technologies Corporation was used. The acceleration voltage was 5 kV, and the imaging mode was a reflected electron image by YAG-BSE.

Each image was taken with 1,280×960 pixels, and by using an automatic photographing function by a ZigZag function of the electron microscope, a total of 36 images of 6 images in a vertical direction and 6 images in a horizontal direction were continuously acquired so that adjacent images had 15% overlap. The acquired images were integrated into one image using a tiling function of "ImagePro 10" ver. 10.0.3 manufactured by Nippon Roper K. K.

A 6,400×4,800 image (visual field size: about 126 μm×about 95 μm) of the central portion was cut out from the integrated image. Then, image analysis was performed under the following conditions, and the particle diameter R, the area S, and the peripheral length P for each domain was calculated.

(i) Lightness of particles: bright (ii) Binarization method: A domain is extracted as a bright portion, and a PP portion and other portions are extracted as dark portions by a smart extraction function.

(iii) Particle division: Watershed method size 6

The diameter, the area, and the peripheral length were calculated from the obtained values, and the number average particle diameter Rn, the volume average particle diameter Rv, and the particle diameter dispersion D were calculated with the number of rubber particles as n.

$Rn=(\Sigma Ri)/n$ $Rv=\Sigma(Ri^4/Ri^3)$ $D=Rv/Rn$ (7) Ten-Point Average Roughness i) Preparation of Test Piece (Extrusion-Molded Article)

Using a USV 25 mmΦ extruder manufactured by Union Plastics Co., Ltd., each of thermoplastic elastomer compositions of Examples and Comparative Examples was extrusion-molded under conditions of a cylinder temperature of 200° C., a full-flight type screw, and a screw rotation speed of 40 rpm to obtain an extrusion-molded article (width: 90 mm, thickness: 1 mm).

ii) Evaluation of Ten-Point Average Roughness

The ten-point average roughness of the surface of the extrusion-molded article produced in the above i) was measured using a surface roughness shape measuring machine "SURFCOM 480A" manufactured by Tokyo Seimitsu Co., Ltd. in accordance with JIS B0601.

(8) Evaluation of Adhesion to Thermoplastic Elastomer Molded Article

A thermoplastic elastomer molded article (Y) obtained in [Reference Example 1] described later was used as an adherend. First, the thermoplastic elastomer molded article (Y) was attached to an injection-molding mold with a double-sided tape.

Then, the thermoplastic elastomer composition produced in each of Examples and Comparative Examples was injection-molded under conditions of a molding temperature of 250° C. and a mold temperature of 50° C. using an IS100EN-3A type injection molding machine manufactured by Toshiba Machine Co., Ltd., to obtain a composite molded article (Z1) in which the thermoplastic elastomer molded article (Y) and the injection-molded article portion containing the thermoplastic elastomer composition obtained in each of Examples were melt-bonded.

The molded article (Z1) was punched with a JIS No. 3 dumbbell so as to include a melt-bonding surface perpendicular to the long side direction of the test piece to prepare a test piece. The test piece was subjected to a tensile test under a condition of a tensile speed of 200 mm/min to evaluate the adhesive strength.

Reference Example 1

(Preparation of Thermoplastic Elastomer Molded Article (Y))

A thermoplastic elastomer "Santoprene 121-73W175" manufactured by Exxon Mobil Corporation was injection-molded using an IS100EN-3A type injection molding machine manufactured by Toshiba Machine Co., Ltd. under conditions of a molding temperature of 220° C., a mold temperature of 50° C., an injection time of 10 seconds, and a cooling time of 30 seconds, to obtain an injection-molded article (length: 150 mm, width: 90 mm, thickness: 2.0 mm). Next, the injection-molded article was cut with a cutter to have a length of 30 mm, a width of 90 mm, and a thickness of 2.0 mm, and this was used as the thermoplastic elastomer molded article (Y).

(9) Specific Energy

The energy required for melt-kneading in the production of the thermoplastic elastomer was determined from the power consumption (kW) of the twin-screw kneading extruder, and this was divided by the discharge rate (kg/h) of the twin-screw kneading extruder to determine the specific energy (kWh/kg).

Details of materials used in Examples and Comparative Examples are as follows.

Oil-Extended Ethylene Random Copolymer (Composition Containing Component (A2) and Component (D)) (A2-i)+(D-i):

A composition obtained by adding 100 parts by mass of paraffinic mineral oil (D-i) (trade name "PW-380" manufactured by Idemitsu Kosan Co., Ltd.) to 100 parts by mass of ethylene-propylene-5-ethylidene-2-norbornene copolymer (A2-i)

Mooney viscosity ($ML_{1+4}$ 100° C.) of (A2-i)+(D-i)=53, Composition of (A2-i)

Content of constitutional unit derived from ethylene=62.0 mass %

Content of constitutional unit derived from propylene=28.1 mass %

Content of constitutional unit derived from 5-ethylidene-2-norbornene=9.9 mass %

Propylene-Based Polymer (Component (B))

(B-i): Propylene homopolymer (h-PP)
MFR (230° C.)=0.5 g/10 min, intrinsic viscosity of xylene insoluble portion [$\eta_{cxis}$]=3.0 dl/g (B-ii): Propylene homopolymer (h-PP)
MFR (230° C.)=13 g/10 min, intrinsic viscosity of xylene insoluble portion [$\eta_{cxis}$]=1.5 dl/g (B-iii): Propylene homopolymer (h-PP)
MFR (230° C.)=100 g/10 min, intrinsic viscosity of xylene insoluble portion [$\eta_{cxis}$]=0.9 dl/g Crosslinking Agent+Mineral Oil (Composition Containing Component (C) and Component (D))

(C-i)+(D-ii): trade name "APO-10DL" manufactured by Kayaku Akzo Corporation

APO-10DL is a composition containing 10 mass % of 2,5-dimethyl-2,5-di(tert-butylperoxy)hexane (C-i) and 90 mass % of paraffinic mineral oil (D-ii) (trade name "PW-100" manufactured by Idemitsu Kosan Co., Ltd.) (provided that the total amount of (C-i) and (D-ii) is 100 mass %))

Fatty acid amide: Trade name "Neutron-S" (erucamide) manufactured by Nippon Fine Chemical Co., Ltd.

Crosslinking aid: Trade name "Sumifine BM" (N,N'-m-phenylene bismaleimide) manufactured by Sumitomo Chemical Co., Ltd.

Antioxidant: Trade name "Irganox 1010" manufactured by BASF Japan Ltd.

Example 1

Using a twin-screw kneading extruder (TEX-44HCT) manufactured by The Japan Steel Works, Ltd., 75.0 parts by mass of an oil-extended ethylene random copolymer ((A2-i)+(D-i)), 25.0 parts by mass of a propylene homopolymer (B-ii), 3.2 parts by mass of a crosslinking agent (C-i+D-ii), 0.125 parts by mass of a fatty acid amide, 0.1 parts by mass of a crosslinking aid (Sumifine BM), and 0.200 parts by mass of an antioxidant were melt-kneaded at 200° C.±20° C. for 40 seconds±20 seconds with a screw pattern A at the specific energy shown in Table 1, to produce a thermoplastic elastomer composition.

The obtained thermoplastic elastomer composition was extrusion-molded by the method of the above (7), and injection-molded by the method of the above (8) to obtain a molded article. The measurement results of physical properties of the molded article and the evaluation result of adhesion to the thermoplastic elastomer molded article are shown in Table 1.

Examples 2 to 5 and Comparative Examples 1 to 3

Each thermoplastic elastomer composition was produced and evaluated in the same manner as in Example 1 except that the blending of the raw materials and the specific energy were changed as shown in Table 1.

The results are shown in Table 1.

TABLE 1

|  |  | Example 1 | Example 2 | Comparative Example 1 | Example 3 | Comparative Example 2 | Example 4 | Comparative Example 3 | Example 5 |
|---|---|---|---|---|---|---|---|---|---|
| (A2-i) + (D-i) EPDM |  | 75.0 | 75.0 | 75.0 | 75.0 | 75.0 | 75.0 | 75.0 | 75.0 |
| (B-i) h-PP |  |  |  | 25.0 |  | 25.0 |  | 25.0 |  |
| (B-ii) h-PP |  | 25.0 |  |  |  |  | 25.0 |  |  |
| (B-iii) h-PP |  |  | 25.0 |  | 25.0 |  |  |  | 25.0 |
| (C-i + D-ii) PO |  | 3.20 | 3.20 | 0.80 | 0.80 | 3.20 | 3.20 | 0.80 | 0.80 |
| Fatty acid amide |  | 0.125 | 0.125 | 0.125 | 0.125 | 0.125 | 0.125 | 0.125 | 0.125 |
| Crosslinking aid |  | 0.100 | 0.100 | 0.100 | 0.100 | 0.100 | 0.100 | 0.100 | 0.100 |
| Antioxidant |  | 0.200 | 0.200 | 0.200 | 0.200 | 0.200 | 0.200 | 0.200 | 0.200 |
| Melt viscosity (12 sec$^{-1}$) | PA · S | 1652 | 1.427 | 3431 | 1615 | 1350 | 1946 | 2811 | 1643 |
| Specific energy | kWh/kg | 0.25 | 0.23 | 0.38 | 0.24 | 0.28 | 0.21 | 0.29 | 0.20 |
| Number average particle diameter | μm | 0.78 | 0.60 | 0.41 | 0.95 | 0.85 | 0.92 | 0.67 | 1.11 |
| Volume average particle diameter | μm | 4.0 | 3.8 | 2.0 | 5.6 | 6.1 | 3.8 | 4.1 | 4.4 |
| Particle diameter dispersion | — | 5.1 | 6.4 | 5.0 | 5.9 | 7.2 | 4.1 | 6.1 | 3.9 |
| Ten-point average roughness | μm | 7.7 | 5.8 | 16.3 | 5.1 | 66.0 | 7.5 | 29.4 | 5.5 |
| Adhesive strength | Mpa | 4.3 | 4.6 | 3.1 | 4.5 | 3.1 | 4.3 | 3.1 | 4.6 |

INDUSTRIAL APPLICABILITY

The thermoplastic elastomer composition of the present invention can produce a molded article having a good appearance such as surface smoothness and excellent bondability to another member, and is particularly suitable for injection molding. Therefore, the thermoplastic elastomer composition is suitably used for applications such as various automobile interior and exterior parts such as glass run channels, weather strips, door grommets, instrument panels, glove boxes, trims, housings, pillars, bumpers, fenders, and back doors, as well as various parts of household electric appliances, various housing equipment parts, various industrial parts, and various building material parts, and has high applicability in various industrial fields such as transport machine industry, electrical and electronic industry, and building and construction industry.

What is claimed is:

1. A thermoplastic elastomer composition comprising:
an ethylene-based polymer (A); and
a propylene-based polymer (B), wherein
a melt viscosity of the thermoplastic elastomer composition measured at a temperature of 220° C. and a shear rate of 12 sec-1 is 2,500 Pa·sec or less;
the thermoplastic elastomer composition has a sea-island structure; and
an island portion has a volume average particle diameter of 2.1 μm or more and a particle diameter dispersion D of 7.0 or less.

2. The thermoplastic elastomer composition according to claim 1, further comprising a mineral oil (D), wherein the ethylene-based polymer (A) is oil-extended with the mineral oil (D).

3. The thermoplastic elastomer composition according to claim 1, wherein the ethylene-based polymer (A) has a Mooney viscosity ($ML_{1+4}$ 100° C.) of 40 or more.

4. The thermoplastic elastomer composition according to claim 2, wherein an oil-extended polymer comprising the ethylene-based polymer (A) and the mineral oil (D) has a Mooney viscosity ($ML_{1+4}$ 100° C.) of 40 or more.

5. A method for producing a thermoplastic elastomer composition according to claim 1, comprising a step of melt-kneading an ethylene-based polymer (A) and a propylene-based polymer (B) in the presence of a crosslinking agent (C), wherein
the ethylene-based polymer (A) has a Mooney viscosity ($ML_{1+4}$ 100° C.) of 40 or more; and
a melt flow rate of the propylene-based polymer (B) measured under conditions of a temperature of 230° C. and a load of 21.18 N is 1.0 to 200 g/10 min.

6. The method for producing a thermoplastic elastomer composition according to claim 5, wherein a specific energy defined by power consumption (kW)/discharge rate (kg/h) by melt-kneading in the step is 0.27 (kWh/kg) or less.

7. A method for producing a thermoplastic elastomer composition according to claim 1, comprising a step of melt-kneading an oil-extended polymer and a propylene-based polymer (B) in the presence of a crosslinking agent (C), wherein
the oil-extended polymer comprises an ethylene-based polymer (A) and a mineral oil (D);
the oil-extended polymer has a Mooney viscosity ($ML_{1+4}$ 100° C.) of 40 or more; and
a melt flow rate of the propylene-based polymer (B) measured under conditions of a temperature of 230° C. and a load of 21.18 N is 1.0 to 200 g/10 min.

8. The method for producing a thermoplastic elastomer composition according to claim 7, wherein a specific energy defined by power consumption (kW)/discharge rate (kg/h) by melt-kneading in the step is 0.27 (kWh/kg) or less.

9. The method for producing a thermoplastic elastomer composition according to claim 5, wherein the thermoplastic elastomer composition comprises
the ethylene-based polymer (A); and
the propylene-based polymer (B), wherein
a melt viscosity of the thermoplastic elastomer composition measured at a temperature of 220° C. and a shear rate of 12 sec-1 is 2,500 Pa·sec or less;
the thermoplastic elastomer composition has a sea-island structure; and
an island portion has a volume average particle diameter of 2.1 μm or more and a particle diameter dispersion D of 7.0 or less.

10. The method for producing a thermoplastic elastomer composition according to claim 7, wherein the thermoplastic elastomer composition comprises
the ethylene-based polymer (A); and
the propylene-based polymer (B), wherein
a melt viscosity of the thermoplastic elastomer composition measured at a temperature of 220° C. and a shear rate of 12 sec-1 is 2,500 Pa·sec or less;
the thermoplastic elastomer composition has a sea-island structure; and
an island portion has a volume average particle diameter of 2.1 μm or more and a particle diameter dispersion D of 7.0 or less;
the mineral oil (D), and wherein
the ethylene-based polymer (A) is oil-extended with the mineral oil (D).

11. An injection-molded article comprising the thermoplastic elastomer composition according to claim 1.

12. A composite molded article which is obtained by bonding the injection-molded article according to claim 11 and an extrusion-molded article comprising a thermoplastic elastomer composition.

13. The composite molded article according to claim 12, wherein the composite molded article is a glass run channel.

* * * * *